(12) United States Patent
Lesage et al.

(10) Patent No.: US 9,429,339 B2
(45) Date of Patent: Aug. 30, 2016

(54) DOMESTIC GAS-FIRED WATER HEATER CONDENSING FLUE SYSTEM

(71) Applicant: MICLAU-S.R.I. INC., Montreal East (CA)

(72) Inventors: Claude Lesage, Pointe-Claire (CA); Jean-Claude Lesage, Kirkland (CA)

(73) Assignee: MICLAU—S.R.I. INC.

( * ) Notice: Subject to any disclaimer, the term of this patent is extended or adjusted under 35 U.S.C. 154(b) by 56 days.

(21) Appl. No.: 14/121,610

(22) Filed: Sep. 25, 2014

(65) Prior Publication Data

US 2016/0091222 A1    Mar. 31, 2016

(51) Int. Cl.
| | |
|---|---|
| *F24H 1/00* | (2006.01) |
| *F24H 8/00* | (2006.01) |
| *F24H 1/18* | (2006.01) |
| *F24H 9/00* | (2006.01) |
| *F23L 17/00* | (2006.01) |

(52) U.S. Cl.
CPC .............. *F24H 8/006* (2013.01); *F23L 17/005* (2013.01); *F24H 1/186* (2013.01); *F24H 9/0031* (2013.01); *F24H 9/0036* (2013.01)

(58) Field of Classification Search
USPC ......................... 122/18.31, 158, 155.1, 155.3
See application file for complete search history.

(56) References Cited

U.S. PATENT DOCUMENTS

| | | | | |
|---|---|---|---|---|
| 1,933,056 | A * | 10/1933 | Hamilton ................ | F24H 1/205 122/156 |
| 4,653,434 | A * | 3/1987 | Wilhelm, Jr. ........... | F24H 1/205 122/18.2 |
| 4,738,224 | A * | 4/1988 | Bruckner ................ | F22B 29/02 122/421 |
| 4,742,800 | A * | 5/1988 | Eising ..................... | F23C 3/004 122/136 R |
| 4,869,232 | A * | 9/1989 | Narang ................... | F24H 9/2035 122/14.1 |
| 5,037,510 | A * | 8/1991 | Nygards .................. | C02F 1/04 122/18.31 |

* cited by examiner

*Primary Examiner* — Gregory Huson
*Assistant Examiner* — John Bargero
(74) *Attorney, Agent, or Firm* — Guy J. Houle; Houle Patent Agency Inc.

(57) ABSTRACT

A domestic gas-fired water heater condensing flue system wherein in one embodiment a blower is secured at the outlet end of the flue pipe to direct the hot flue gases through an external heat exchange flue conduit. The external heat exchange flue conduit has a sealed water channel surrounding a narrow flue gas internal passage. Water from the bottom end of the tank is circulated in the external heat exchange flue conduit and release in the top part of the tank. In a further embodiment, an inverted U-shaped flue pipe is supported vertically in the water tank and the domestic water supply for the tank is disposed in a downward section of the flue pipe to pre-heat the water supply to the tank and cool the flue gases before being released to atmosphere. The water in the tank is heated by the upward and downward sections of the U-shaped flue pie.

4 Claims, 4 Drawing Sheets

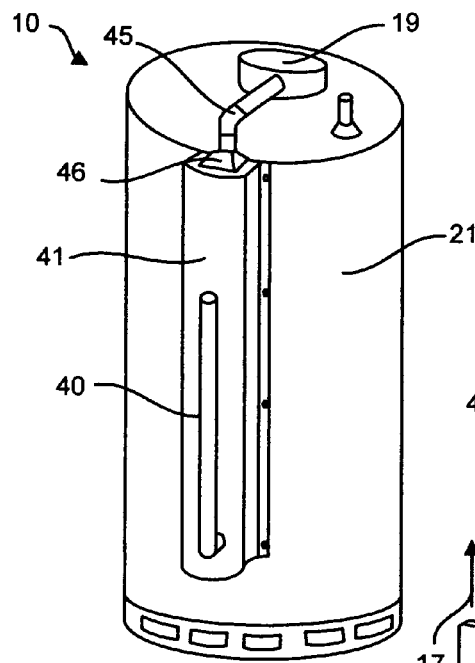
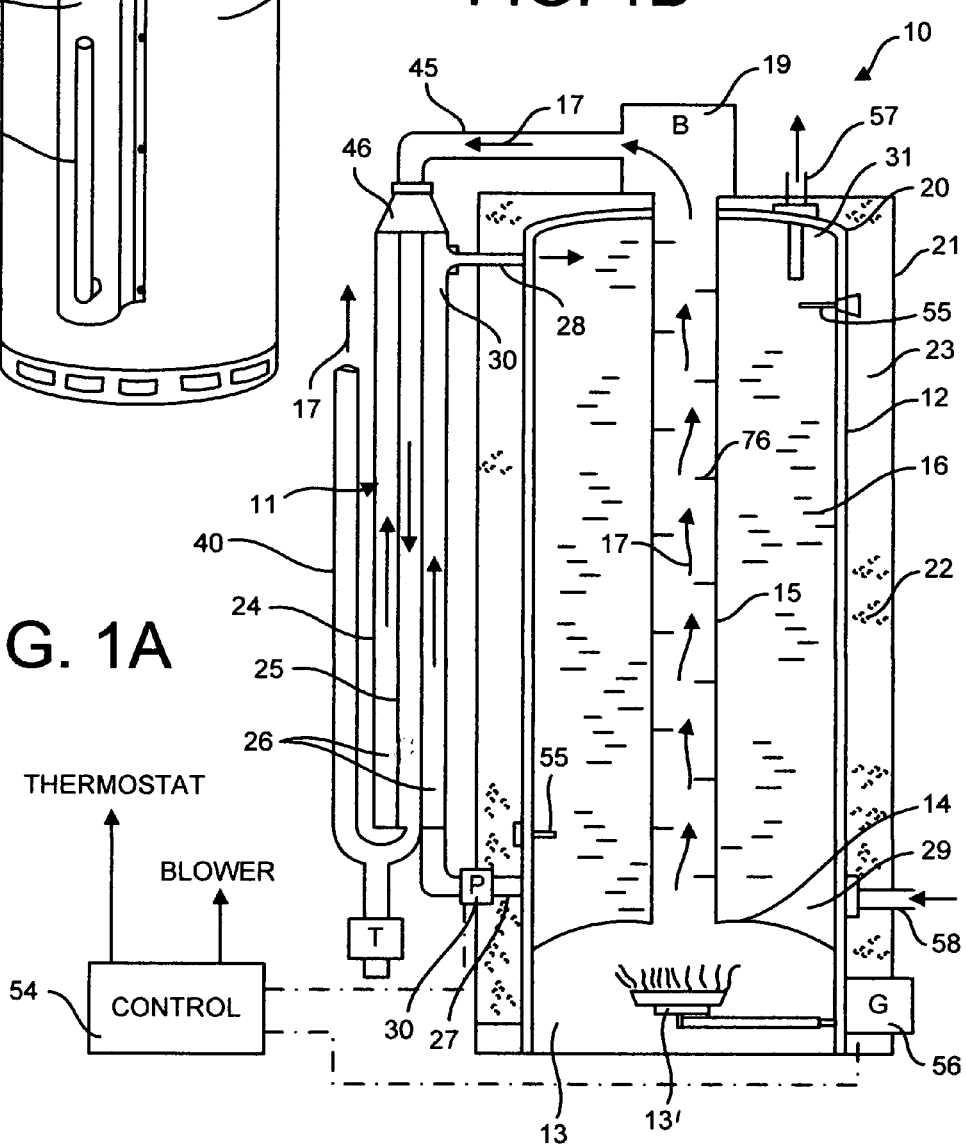
FIG. 1B
FIG. 1A

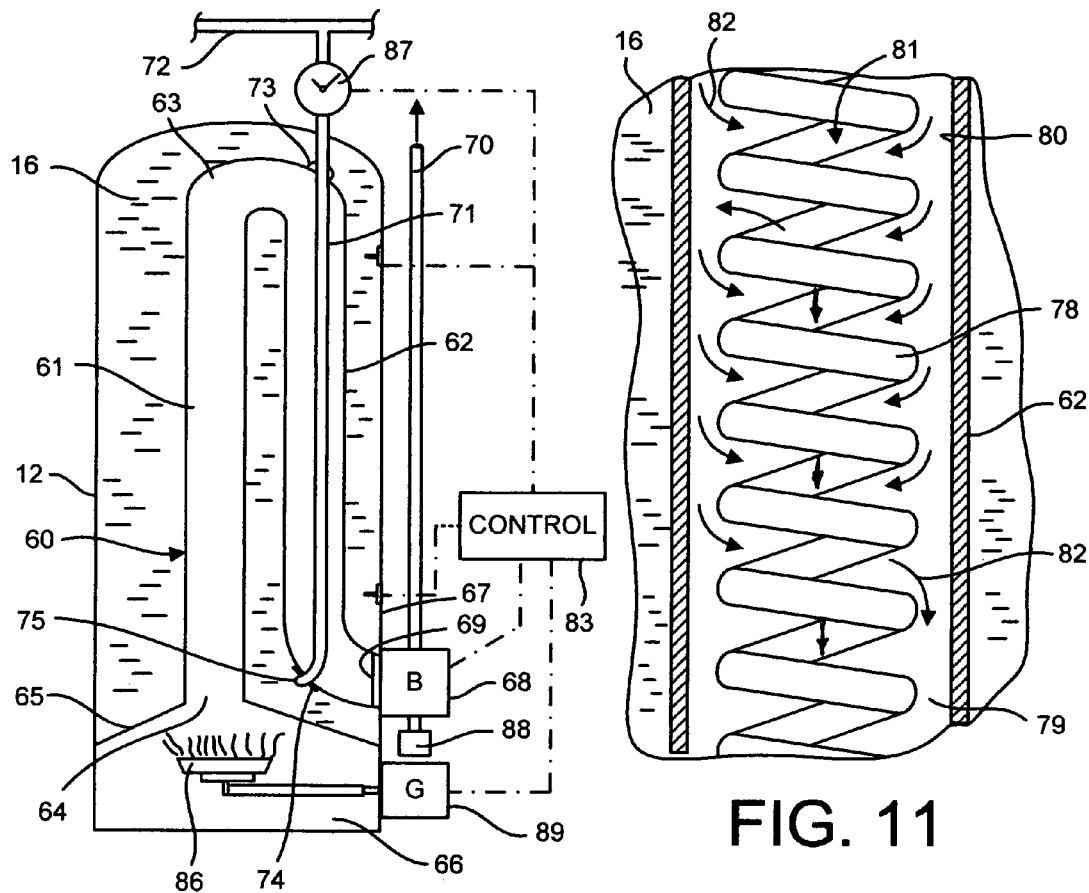
FIG. 10
FIG. 11
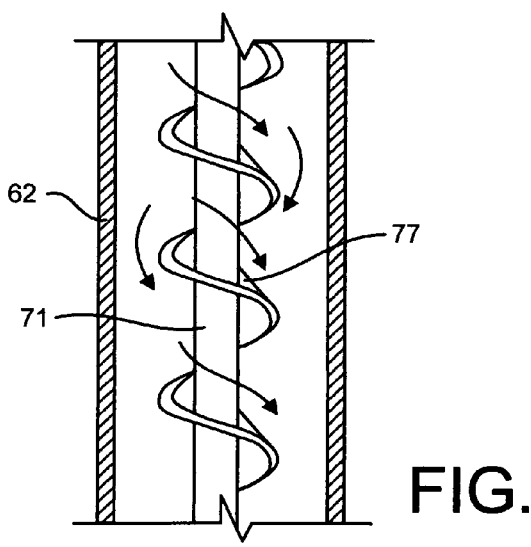
FIG. 12

DOMESTIC GAS-FIRED WATER HEATER CONDENSING FLUE SYSTEM

TECHNICAL FIELD

The present invention relates to domestic gas-fired water heaters and more particularly to a condensing flue system of such water heaters to increase the thermal efficiency of the flue gases.

BACKGROUND OF THE INVENTION

Various flue pipe heat exchange arrangements and designs are known to extract heat from the hot flue gases leaving the combustion chamber and convected through the flue pipe extending in the water tank to transfer the heat from the flue gases to the water within the tank which surrounds the flue pipe. Baffles are commonly installed in the flue pipe to increase the heat transfer by slowing the speed of the flue gases while increasing turbulence thereof for longer contact of the hot gases with the flue pipe wall and the baffle plates mounted therein. Various baffle designs have been developed to achieve this improved heat transfer. However, condensation develops in the flue pipe and this is undesirable. An ideal design is to prevent or substantially minimize the formation of condensation in the vertical flue pipe section directly above the combustion chamber while extracting maximum heat from the flue gas to heat the water in the tank. Condensation is known to cause corrosion of the steel and the baffle plates.

Several know designs have been patented to increase the efficiency of the water heater by the extraction of heat from the flue pipe as it exits the water heater tank. The extracted heat may be used to heat water circulated from the bottom of the water tank to the top of the tank. However, those known system designs have their limitations and usually the flue gases are exhausted to atmosphere at higher than desirable temperatures. Ideally, the flue gases should be exhausted at about 100 degrees F., to provide for an efficient heat transfer system. It is also known to extract heat from the hot flue gases for other purposes than for heating the water in the tank of the water heater. For example, the extracted heat may be used for local heating of the air or heating another liquid in a heat exchanger.

More recently, different approaches have been suggested wherein the flue pipe is configured to have two or more sections extending through the water in the water tank. These are commonly referred to as multi-pass condensing type flue designs. However, these designs have resulted in other problems such as occupying extra space in the water tank and therefore reducing the tank capacity for water or increasing the size of the tank to accommodate the extra flue length and therefore adding to increase costs. They have also resulted in condensation evacuation problems. The extra costs of the flue pipe and its installation cost is not recoverable after the life of the water heater.

SUMMARY OF THE INVENTION

It is a feature of the present invention to provide a domestic gas-fired water heater condensing flue system which substantially overcomes some of the above mentioned deficiencies of the prior art.

It is another feature of the present invention to provide a domestic gas-fired water heater condensing flue system having an external high efficiency heat exchange flue conduit having a narrow flue gas internal passage surrounded by water circulated from the bottom of the tank to the top of the tank and fitted to the outside of the water tank whereby it is recyclable after the life of the water tank.

Another feature of the present invention is to provide a domestic gas-fired water heater condensing flue system comprised by an inverted U-shaped flue disposed substantially vertically in the water tank and having a conduit, from the domestic water line, disposed in a downward section of the flue pipe to extract heat from the flue gas to feed heated water to the bottom section of the tank while acting as a baffle to improve heat transfer to the water in the tank.

According to the above features, from a broad aspect, the present invention provides a domestic gas-fired water heater condensing flue system comprising a water tank having a domestic water line inlet and a hot water outlet. A combustion chamber is provided under the bottom wall of the water tank. A flue pipe is sealing secured in the water tank and extends from a bottom opening in the bottom wall, through the water tank and out of a sealed top opening in the top wall of the water tank. A blower is secured to the flue pipe above the top wall for directing hot flue gases from the combustion chamber to an external heat exchange flue conduit section. The external heat exchange flue conduit section has an internal passage through which the flue gases are convected by the blower. A sealed water channel surrounds at least a major length of the external heat exchange flue conduit section. The water channel has an inlet connection at a lower end thereof and an outlet connection at an upper end thereof. The inlet connection receives water from a lower section of the water tank and the outlet connection delivers heated water from the water channel to an upper section of the water tank. Water convection means convects water from the inlet connection to the outlet connection with the water being displaced about the internal passage to extract heat therefrom to heat the convected water for release in the upper section of the water tank and to cool the flue gases in the internal passage. An exhaust flue pipe section is secured at an exit end of the external heat exchange flue conduit section.

According to another broad aspect of the present invention there is provided a domestic gas-fired water heater condensing flue system comprised of a water tank having a water inlet and a hot water outlet. A combustion chamber is provided under a bottom wall of the water tank. The water tank has a sealed top wall. An inverted U-shaped flue pipe which defines an integrally formed upward section and a downward section is retained vertically in the water tank. The upward section is sealingly secured at an inlet end thereof to an opening is the bottom wall of the water tank to receive hot flue gases from the combustion chamber. The downward section is sealingly secured at an outlet end thereof to an exit opening in a side wall of a bottom section of the water tank spaced above the bottom wall. A blower is connected to the exit opening for convecting flue gases therefrom to an external exhaust flue pipe. A heat exchange water conduit extends inside the downward section. The heat exchange water conduit has a sealed inlet connection through a top end section of the downward section for coupling with a pipe connected to the domestic water line. The heat exchange conduit has a sealed outlet connection through a lower end section of the downward section to provide the water inlet of the water tank for releasing domestic water pre-heated by the hot flue gases displaced in the downward section of the flue pipe.

BRIEF DESCRIPTION OF THE DRAWINGS

A preferred embodiment of the present invention will now be described with reference to the examples thereof as illustrated in the accompanying drawings in which:

FIG. 1A is a simplified cross-sectional view of a water heater illustrating some basic components thereof and to which is secured the external heat exchange flue conduit of the present invention to extract heat from the exit end of the flue pipe above the water heater and to heat water recirculated from the bottom of the water tank to the top of the tank;

FIG. 1B is a simplified perspective view of a water heater having the external heat exchange flue conduit secured to the outside wall of the water heater;

FIG. 10 is a simplified cross-section view illustrating a further modified embodiment wherein an inverted U-shaped flue pipe is supported vertically in the water tank to extract heat from the hot flue gases;

FIG. 11 is a fragment cross-section view illustrating a modification of the heat exchange water conduit formed as a spiral heat exchange water conduit, and FIG. 12 is a fragmented cross-sectional view illustrating a further modification wherein a spiral baffle is secured about the heat exchange water conduit disposed with the downward section of the flue pipe.

DETAILED DESCRIPTION

Figure 2:
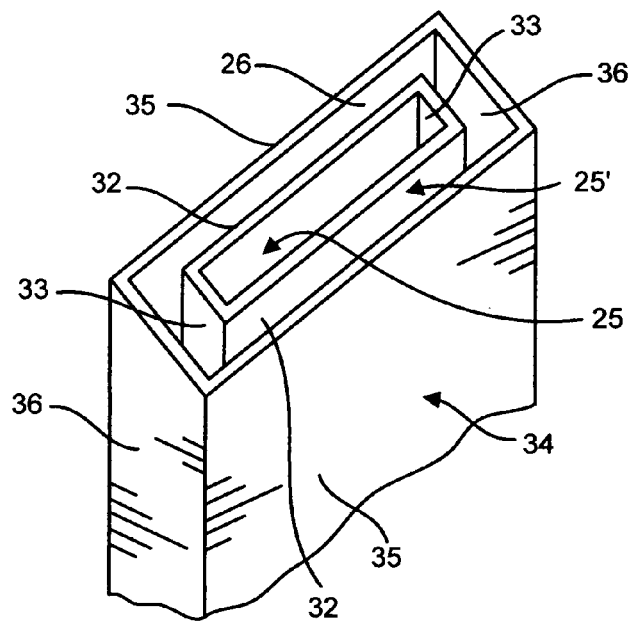
FIG. 2 is a fragmented perspective view showing the construction of the external heat exchange flue conduit.

Referring now to the drawings and more particularly to FIG. 1 there is illustrated generally at 10 a domestic gas-fired water heater incorporating therewith a first example of the external condensing flue system 11 of the present invention. Herein shown, are some basic parts of a domestic gas-fired water heater 10 and comprising a water tank 12 having a combustion chamber 13 equipped with a gas burner 13' disposed under a bottom wall 14 of the tank to heat the water 16 in the tank 12. A flue pipe 15 extends vertically in the tank and is surrounded by the water 16 to be further heated by the hot flue gases 17 convected through the flue pipe which is in heat exchange with the water 16 through the walls 18 of the flue pipe. A blower 19 is mounted on the top wall 20 of the tank to draw the hot flue gas from the combustion chamber 13. The flue pipe 15 is sealingly secured between holes formed in the bottom and top walls of the water tank 12. An outer casing 21 surrounds the tank 15 and insulation 22 is injected or otherwise disposed in the gap 23 between the tank 15 and the outer casing 21, as is conventional in the construction of water heaters.

Figure 3:
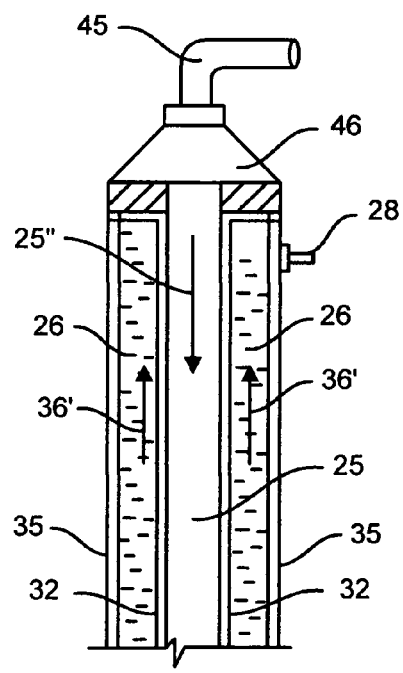
FIG. 3 is a transverse section view illustrating the operation of the external heat exchange flue conduit.

With further reference to FIGS. 2 to 6, there will now be described the construction and operation of the condensing flue system 11 of the present invention. As herein illustrated, the system comprises an external heat exchange flue conduit section 24 forming a narrow internal passage 25 through which the flue gases 17 are forced by the blower 19. The blower could also be secured downstream of the flue conduit section 24 to draw the hot gasses there through. A sealed water channel 26 surrounds the internal passage 25 in at least a major length of the flue conduit section 24. The water channel 26 has an inlet connection 27 at a lower end thereof and an outlet connection 28 at an upper end thereof. These connections 27 and 28 are adapted to receive quick-connect couplings of a flexible hose (not shown). The inlet connection 27 receives water from a lower section 29 of the water tank via a small pump 30 coupled thereto. The outlet connection 28 delivers heated water 30 from the top end of the water channel 26 into the upper part 31 of the tank containing hot water. It is noted that the water from the bottom of the water tank 12 may be convected through the water channel 26 by natural convection of water due to the differential in water temperature between the cooler water in the tank lower section 29 and the hot water in the tank upper section 31. FIG. 3 illustrates the downward flow direction of the flue gases, see arrow 25", and the upward flow direction of the circulated tank water, see arrow 36'.

As can be seen from FIGS. 2 to 5, the internal passage 25 is a narrow rectangular passage formed by a narrow conduit 25' having opposed elongated side walls 32 and short end walls 33 to define an extended or large heat exchange surface area all about the internal passage containing hot flue gas. The water channel 26 is defined by the space between an outer casing 34 of the external condensing flue system 11 which is herein shaped like the internal passage and defining opposed parallel side walls 35 and opposed parallel end walls 36. The narrow inner conduit 25' is constructed of stainless steel material and the outer casing 34 of copper material or stainless steel. As can be seen from FIG. 5, brackets 37 interconnect the inner conduit 25' to the outer casing 34 and oriented not to obstruct the flow of water to the outlet connection 28.

Figure 4:
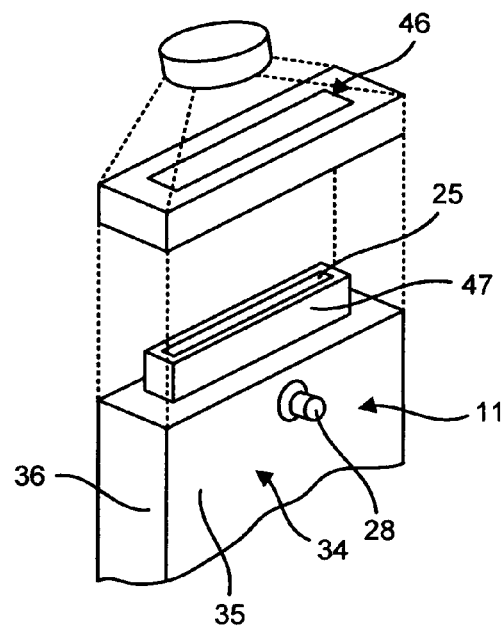
FIG. 4 is a perspective view, partly fragmented, of the top end of the external heat exchange flue conduit.
Figure 5:
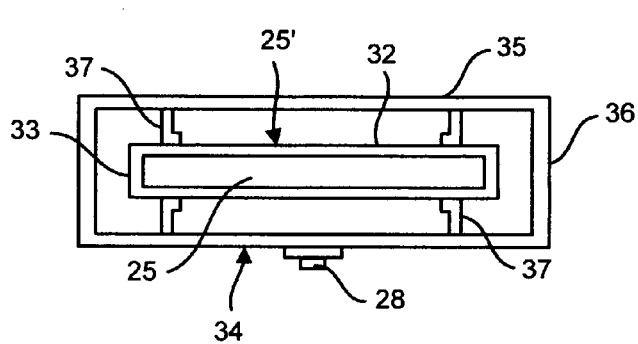
FIG. 5 is a transverse section view through the external heat exchange flue conduit.
Figure 6:
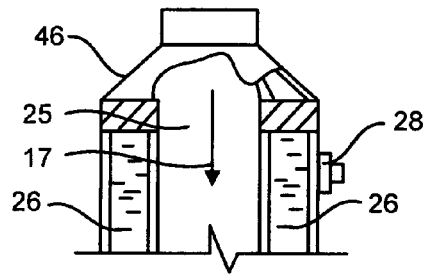
FIG. 6 is a fragmented side view illustrating the flue coupling at the top end of the external heat exchange flue conduit.

Referring to FIGS. 4 and 5, it can be seen that the blower 19 is coupled to the top of the external condensing flue system 11 by an external flue pipe section 45 and a flue coupling 46. The flue coupling 46 is designed to fit over a top end coupling extension 47 of the external condensing flue system 11 whereby the flue gases are directed into the internal passage 25 thereof under pressure from the blower. Other suitable coupling arrangements are also possible.

As shown in FIG. 1A, the bottom end of the internal passage 25 opens in a u-shape pipe coupling 38 equipped with a condensate trap 39 which is connected to a drain (not shown) to evacuate condensate water from the bottom of the internal passage and the exhaust flue pipe 40 exhausting the cooled flue gases to atmosphere. The entire external condensing flue system 11 is a reusable system which can be easily disconnected from the water heater 10 by disconnecting the conduits 27 and 28 from the water tank 12 which supports the system 11 and the connection to the blower 14 and the exhaust flue pipe 40. The system can be easily re-connected to a replacement water heater. As shown in FIG. 1B, the system 11 is neatly packaged against the water heater outer casing 21 and concealed by a removable panel 41.

Figure 7:
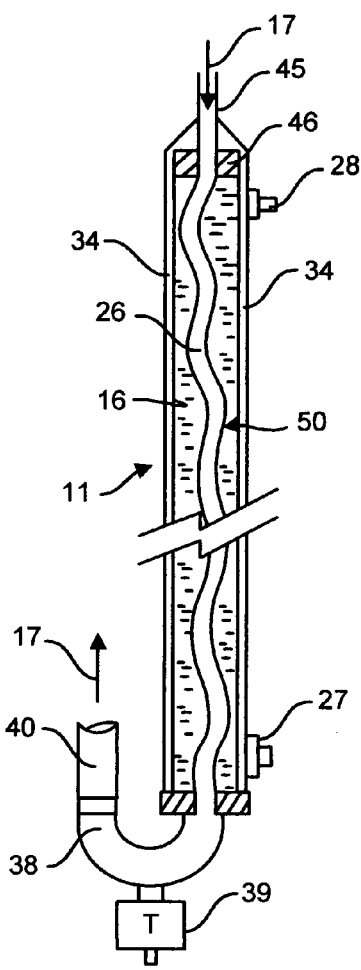
FIG. 7 is a simplified cross-section view illustrating a modification of the internal flue gas passage in the external heat exchange flue conduit.

FIG. 7 illustrates a possible modification to the internal passage conduit 25 which is herein shown as being manufactured from a heat conductive and formable material, such as malleable copper, to define an undulating internal passage 50 to increase the heat exchange surface area of the narrow conduit 25' to improve heat exchange with the surrounding water.

Figure 8:
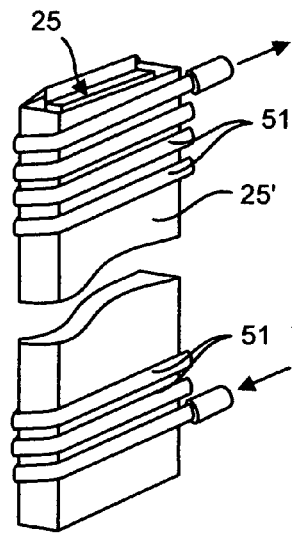
FIG. 8 is a perspective view, partly fragmented, illustrating a further modification wherein the water channel is a water pipe coiled about the external heat exchange flue conduit section.
Figure 9:
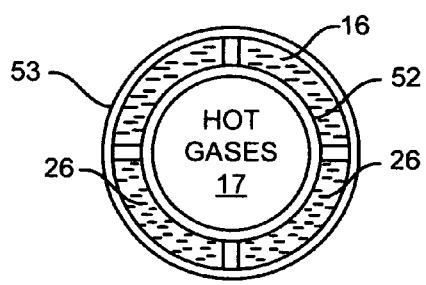
FIG. 9 is a transverse section view illustrating a further modified construction of the external heat exchange flue conduit.

FIG. 8 illustrates another modification of the external condensing flue system 11 wherein, instead of a channel being formed about the narrow flue conduit 25', the water from the tank 12 is recirculated about the conduit 25' by a water pipe 51 coiled about the narrow flue conduit 25'. An insulating material is preferably applied over the coiled water pipe 51 and the conduit 25'. This arrangement however would not be as compact as the preferred design of FIGS. 1 to 5. Another possible design is to secure concentric conduits together as shown in FIG. 9, wherein an inner conduit 52 formed of heat conductive material is used as the exhaust gas conduit and the outer spaced conduit 53 forms the water channel about the inner conduit. Such an arrangement is more compact, but the heat exchange surface area is greatly reduced and therefore not achieving the same efficiency as the embodiment of FIGS. 1 to 5.

Referring again to FIG. 1A the system of the embodiment of FIGS. 1 to 9 is controlled by a programmable controller 54 which receives signals from a thermostat (not shown), and water temperatures sensors 55 and controls the gas valve 56, the blower 19 and the pump 30 to operate the water heater to heat water when water is drawn from the tank through the hot water conduit 57 at the top of the tank. As hot water is drawn out from the top of the tank, domestic water is introduced at the bottom of the tank through conduit 58 or a dip tube as obvious to a person skilled in the art Referring now to FIGS. 10 to 12 there is shown another embodiment wherein an inverted U-shaped flue pipe 60 is supported substantially vertically in an inverted manner entirely inside the water tank 12. The inverted U-shaped flue pipe 60 defines an upward flue section 61 and a downward flue section 62 integrally formed and interconnected by a curved neck section 63 to permit smooth convection of the flue gases between the sections. The U-shaped flue pipe is retained in the tank by its welded connections, at an inlet end thereof, about an opening 64 formed in the bottom wall 65 of the tank above the combustion chamber 66, and its welded connection, at an outlet end thereof, to the tank sidewall 67 above and closely spaced from the tank bottom wall 65.

A blower 68 is connected to an exit coupling 69 for drawing flue gases therefrom to an external exhaust flue pipe 70. As herein shown, the inlet water supply for the tank 12 is provided by a heat exchange conduit 71 connected to the domestic supply line 72 and extending through the downward section 62 of the inverted U-shaped flue pipe 60 from a sealed coupling 73 at the top end of the downward section to a further sealed coupling 74 at a bottom end thereof. The open end 75 of the heat exchange conduit 71 releases pre-heated domestic water into the bottom end of the tank 12. The domestic water supply through the heat exchange conduit is heated by the hot flue gases drawn down in the downward section 62 of the flue pipe and the turbulence it cause by obstructing the flue gases. This obstruction also acts as a baffle and adds to the retention time of the flue gases and improves the heat transfer to the downward section 62 of the flue pipe for heat exchange with the water 16 in the tank 12.

The retention time of the flue gases can also be achieved by securing baffle fin plates 76 or other obstructing formations in the downward section 62 of the flue pipe. Such baffles plates 76 are shown in FIG. 1A and are well known in the art. The plates 76 may be formed in a metal strip secured in the flue pipe with the plates spaced-apart from one another and angularly disposed in an outward direction to retard the flow of the flue gases. As shown in FIG. 12, the heat exchange conduit 71 may have a spiral vane 77 secured thereabout to impart a spiral motion to the hot flue gases to extend to flow path of the hot gases by creating a spiral movement of the gas against the inner surface of the downward section 62 of the flue pipe 60 to improve heat transfer to the surrounding water in the tank.

FIG. 11 shows a further modification of the heat exchange conduit 71 wherein the conduit is shaped as a spiral heat exchange water conduit 78 welded to the outer side wall of the heat exchange water pipe to provide heat exchange contact. It has an outer diameter smaller than the inner diameter of the downward section 62 of the flue pipe whereby to create a space 79 between the outer diameter of the spiral water conduit 78 and the internal side wall 80 of the flue pipe downward section 62. Accordingly, the spiral water conduit 78 constitutes a flue gas dampening means or baffle to cause turbulence of the flue gases drawn in the downward section of the flue pipe by the blower 68 sucking the flue gases from the combustion chamber 66. As shown by arrow 81 some of the hot gases pass straight down inside the spiral conduit while other of the gases impinge on the coil and cause turbulence along the internal side wall 80 as indicated by arrows 82. Typically, the spiral conduit 78 and the flue pipe 60 are constructed of stainless steel.

As shown in FIG. 10 a controller 83 receives temperature signals from the sensors 84 and 85 in the water tank 12 and controls the operation of the gas burner 86 in the combustion chamber 66 through a gas valve 89 and a valve 87 secured to the domestic water line 72 and the heat exchange conduit 71. The controller 83 also controls the operation of the blower 68 and the water supply valve 87. The controller is also programmed to work with the thermostat, not shown, to perform other functions as known in the art.

A condensate trap 88 is secured under the blower at the lower end juncture of the downward section 62 of the flue pipe and the external exhaust flue pipe 70 to channel condensation water from these pipes to a suitable drain as is well known in the art.

It is within the ambit of the present invention to cover any modifications of the examples of the preferred embodiments described herein, provided such modifications fall with the scope of the appended claims.

The invention claimed is:

1. A domestic gas-fired water heater condensing flue system comprising a water tank having a domestic water line inlet and a hot water outlet, a combustion chamber under a bottom wall of said water tank, a flue pipe sealingly secured in said water tank and extending from a bottom opening in said bottom wall through said water tank and out of a top opening in a top wall of said water tank, a blower secured to said flue pipe above said top opening for directing hot flue gases from said combustion chamber to an external heat exchange flue conduit section, said external heat exchange flue conduit section being removably secured to an outer casing about said water tank and concealed by a removable panel for protection, said external heat exchange flue conduit section having an internal narrow rectangular passage formed by a narrow conduit having opposed elongated side walls and short end walls to define an extended heat exchange surface area through which said flue gases are convected by said blower, a sealed water channel surrounding at least a major length of said external heat exchange flue conduit section, said water channel being defined between an outer casing secured about and spaced-apart from said elongated side walls and short end walls of said internal passage and having an inlet connection at a lower end thereof and an outlet connection at an upper end thereof, said inlet connection receiving water from a lower section of said water tank and said outlet connection delivering heated water from said water channel to an upper section of said water tank, and a water pump secured in a water line between said inlet connection and said lower section of said water tank and operated to convect water from said inlet connection to said outlet connection, as soon as said blower is operated, with said water being displaced about said internal passage to extract heat thereform to heat said convected water for release in said upper section of said water tank and to cool said flue gases in said internal passage, and an exhaust flue pipe section secured at an exit end of said external heat exchange flue conduit section.

2. The domestic gas-fired water heater condensing flue system of claim 1 wherein said narrow rectangular passage is constructed of stainless steel material, said outer casing being constructed of copper material.

3. The domestic gas-fired water heater condensing flue system of claim 1 wherein a condensate collection drain trap is secured adjacent and spaced from under a lower end of said external heat exchange flue conduit section for evacuating condensate water.

4. The domestic gas-fired water heater condensing flue system of claim 1 wherein said narrow conduit is formed from a heat conductive and formable material formed to define an undulating internal passage to increase the heat exchange surface area of said narrow conduit.

* * * * *